United States Patent
Bening

(10) Patent No.: US 7,118,269 B2
(45) Date of Patent: Oct. 10, 2006

(54) METHOD OF CORRECTING A REAL-TIME CLOCK OF AN ELECTRONIC APPARATUS

(75) Inventor: Andreas Bening, Roetenback/Peg. (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 320 days.

(21) Appl. No.: 10/276,196

(22) PCT Filed: Mar. 13, 2002

(86) PCT No.: PCT/IB02/00796

§ 371 (c)(1),
(2), (4) Date: Nov. 12, 2002

(87) PCT Pub. No.: WO02/076061

PCT Pub. Date: Sep. 26, 2002

(65) Prior Publication Data

US 2003/0174587 A1    Sep. 18, 2003

(51) Int. Cl.
*G04B 17/20* (2006.01)
*G04B 18/00* (2006.01)

(52) U.S. Cl. .................. 368/200; 368/202; 324/76.48
(58) Field of Classification Search ........ 368/200–202; 324/76.48
See application file for complete search history.

(56) References Cited

U.S. PATENT DOCUMENTS

| | | | | |
|---|---|---|---|---|
| 4,378,167 A | * | 3/1983 | Aizawa | ...................... 368/201 |
| 4,407,589 A | * | 10/1983 | Davidson et al. | ........... 368/201 |
| 4,408,897 A | * | 10/1983 | Mutrux | ....................... 368/200 |
| 4,903,251 A | * | 2/1990 | Chapman | .................... 368/156 |
| 5,313,154 A | | 5/1994 | Norris | ..................... 324/76.48 |
| 5,375,105 A | * | 12/1994 | Borowski | ................... 368/202 |
| 5,481,507 A | * | 1/1996 | Suzuki et al. | ............... 368/200 |
| 5,613,235 A | | 3/1997 | Kivari et al. | ............... 455/343 |
| 5,717,661 A | * | 2/1998 | Poulson | ...................... 368/202 |

* cited by examiner

*Primary Examiner*—Vit W. Miska
(74) *Attorney, Agent, or Firm*—Aaron Waxler; Paul Im

(57) ABSTRACT

A method of correcting a real-time clock of an electronic apparatus, notably a mobile telephone, in which the real-time clock operates with a first clock generator which generates a real-time clock while the electronic apparatus operates with a second clock generator which generates a system clock, which method includes the following steps: determining the actual frequency of the real-time clock, determining the ratio $V_{clock/standard}$ of the actual frequency of the real-time clock to the reference frequency of a standard clock, determining the deviation time of the real-time clock per second from the difference $(1-V_{clock/standard})$, determining, on the basis of the deviation time per second, a time difference dt within which the real-time clock is to be corrected by a correction time difference Δt, correcting the real time by Δt after expiration of dt.

9 Claims, 1 Drawing Sheet

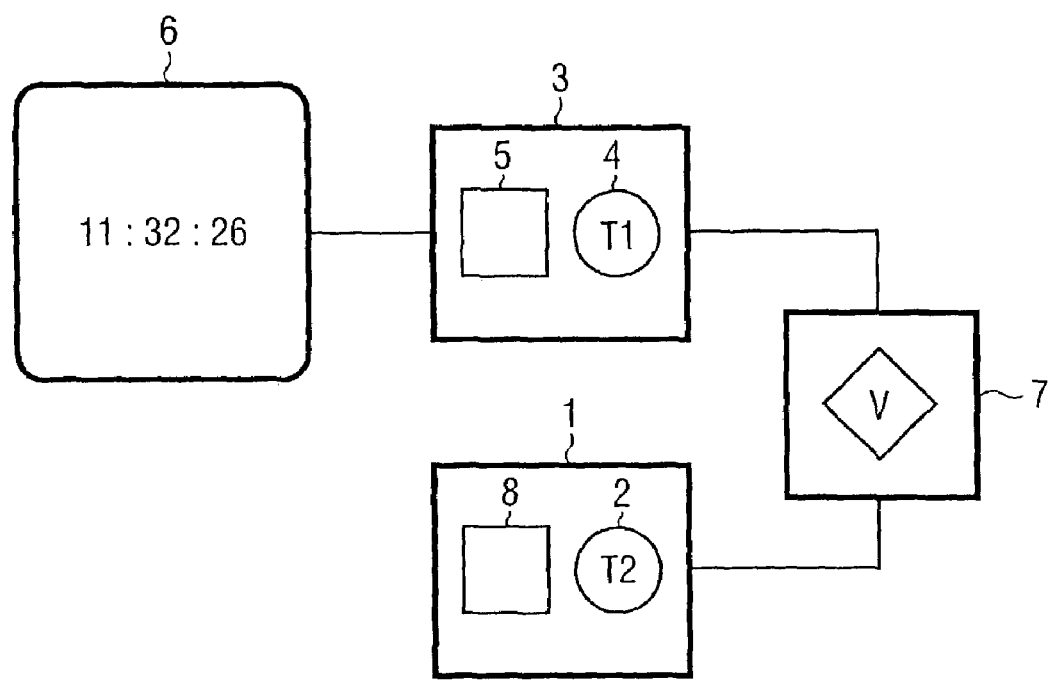

METHOD OF CORRECTING A REAL-TIME CLOCK OF AN ELECTRONIC APPARATUS

The invention relates to a method of correcting a real-time clock of an electronic apparatus, notably a mobile telephone, the real-time clock operating with a first clock generator which generates a real-time clock while the electronic apparatus operates with a second clock generator which generates a system clock.

Electronic apparatus of this kind are known, for example in the form of mobile telephones. The second clock generator serves to generate a system clock with which the mobile telephone operates. For example, the relevant transmission frequencies or the entire transmission between mobile telephone and network are derived from the clock given. An extremely stable RF oscillator is used as a clock generator; such an oscillator usually oscillates at a frequency of 13 MHz. There is also provided a first clock generator which drives a real-time clock. This first clock generator is of relevance on the one hand for the transmission and receiving mode of the mobile telephone, because it delivers the temporal information for the paging mode of the mobile telephone. In the context of such a paging mode time intervals are subdivided into individual, successive frames as is known quite well in the field of mobile telephones, so that it need not be explained further. The real-time clock also serves to enable display of the actual time to the user of the telephone.

The first clock generator is usually a 32 kHz or 64 kHz quartz oscillator. For example, in the case of a 32 kHz oscillator an ideal quartz oscillator oscillates at a frequency of 32768 Hz. Oscillators customarily used for this purpose, however, usually deviate from this ideal frequency or, since they are comparatively simple and inexpensive components, are comparatively unstable and respond, for example, to temperature fluctuations by exhibiting frequency fluctuations, etc. Because of the frequency instability, therefore, the real-time clock runs incorrectly. Consequently, the time that can be displayed to the user does not correspond to the real time. Such deviations are larger, or occur faster after adjustment of the real-time clock, as the actual frequency deviates more from the previously mentioned standard frequency of, for example, 32768 Hz. This means that the user has to readjust the clock at comparatively short intervals.

Therefore, it is an object of the invention to provide a method which enables correction of such real time in a simple manner, that is, without user intervention being required.

In order to achieve this object, a method of the kind set forth in accordance with the invention is characterized in that it includes the following steps:
determining the actual frequency of the real-time clock,
determining the ratio $V_{clock/standard}$ of the actual frequency of the real-time clock to the reference frequency of a standard clock,
determining the deviation time of the real-time clock per second from the difference $(1-V_{clock/standard})$,
determining, on the basis of the deviation time per second, a time difference dt within which the real-time clock is to be corrected by a correction time difference $\Delta t$,
correcting the real time by $\Delta t$ after expiration of dt.

In conformity with the method of the invention, the actual frequency of the real-time clock is first determined in an arbitrary manner, meaning that the frequency at which the real-time clock oscillates is determined. In this context the term "actual frequency" does not necessarily mean the relevant instantaneous frequency; to the contrary, the actual frequency, or corresponding information enabling determination of the actual frequency, may have been determined already prior to the correction step. Subsequently, the ratio of this actual frequency to the standard frequency of the ideal oscillator is determined in order to determine the deviation of the real-time clock per second therefrom. When this deviation per second is known, the time difference dt within which the real-time clock must be readjusted by a correction time difference $\Delta t$, for example, one second, can be readily determined, be it that the clock is too slow and must be advanced or that the clock is too fast and must be set back. Subsequently, after expiration of dt the clock is readjusted by $\Delta t$. The method in accordance with the invention thus enables automatic correction, so that the user is always displayed the real time.

The correction mechanism may be automatic to the extent that continuous correction is performed in such a manner that either the actual frequency is determined each time after expiration of dt, so after a preceding correction, and a new time difference dt is determined, said new time difference dt relating to the last correction instant. Alternatively, of course, it is also possible to retain the actual frequency determined for a given period of time and to perform a new determination only after expiration of several time differences dt so as to perform a correction each time after expiration of dt. Arbitrary schemes as to when or how often and on the basis of which actual frequency the correction is performed are thus feasible.

According to a further elaboration of the invention it may be arranged that the actual frequency is determined from the previously determined ratio of the frequency system clock to the actual frequency of the real-time clock. In many mobile telephones a value indicating the ratio of the frequency of the system clock to the actual frequency of the real-time clock is inherently determined on the basis of software. In that case the actual frequency of the real-time clock is not directly determined; this ratio or the value is calculated instead from the given system clock and clock information arising from the frame mode of operation. For the frame mode of operation the deviation of the real-time clock can thus be determined so as to be taken into account in the context of the frame mode of operation. The determination of this ratio or value is known per se and need not be further elaborated. However, because this ratio indicates the ratio of the system clock frequency to the real-time clock frequency and because the system clock frequency is extremely stable, that is, at least approximately the same at any instant, the actual frequency of the real-time clock can be simply derived from this ratio so as to be used as a basis for further processing. Alternatively, of course, it is also possible to determine the actual frequency of the real-time clock directly.

In a further elaboration of the idea of the invention it may be arranged that for the time difference it is determined when the real-time clock is to be corrected by a correction time difference of one second. Thus, in conformity with this version of the invention the real-time clock can deviate by one second at the most, because the correction takes place automatically after expiration of a time difference within which the clock is one second fast or slow.

As described above, the determination and correction can take place automatically and continuously. In the case where the actual frequency is determined from the ratio of the system clock frequency to the real-time clock frequency, a change of the real-time clock frequency underlying the calculation arises from a change of the value of the ratio which is also determined anew by software, that is, each time after expiration of a given period of time. This ratio value is stored in a register in known mobile telephones. After determination of a new ratio value, it is written into the register and read out so as to determine the actual frequency when necessary.

In addition to the method, the invention also relates to a real-time clock for generating and delivering signals indicating the time of day, which clock includes:
a clock generator for generating a real-time clock for operating the real-time clock, and
means for determining the deviation time of the real-time clock per second and, on the basis thereof, a time difference dt within which the real-time clock is to be corrected by the correction time difference Δt, and for generating a correction time difference signal after expiration of the time dt.

The first means may be arranged to determine the actual frequency of the real-time clock, to determine the ratio $V_{clock/standard}$ of the actual frequency of the real-time clock to the reference frequency of a standard clock, to determine the deviation time of the real-time clock per second from the difference $(1-V_{clock/standard})$, and to determine the time difference dt, on the basis of the deviation time per second, within which the real-time clock is to be corrected by a correction time difference Δt. Furthermore, the first means may be arranged to determine the actual frequency of the real-time clock from an already known ratio of the frequency of a system clock at which an electronic apparatus comprising the real-time clock, notably a mobile telephone, operates to the actual frequency of the real-time clock.

The means are advantageously implemented in the form of a computer program with program coding means conceived in conformity with the method, meaning that the complete determination of all relevant parameters takes place purely mathematically. For readjustment of the real-time clock, finally, electrical signals are to be generated. When the signals are generated, the corrected clock time is automatically displayed on the display.

Finally, the invention also relates to an electronic apparatus, notably a mobile telephone, which includes a real-time clock which operates with a first clock generator which generates a real-time clock and with a second clock generator which generates a system clock and with which the electronic apparatus, notably the mobile telephone, operates. This electronic apparatus is characterized in that it includes a real-time clock of the described kind.

Further advantages, characteristics and details of the invention will become apparent from the following description of an embodiment which is given with reference to the drawing.

The drawing shows the principle of an electronic apparatus in accordance with the invention in the form of a mobile telephone which is provided with a real-time clock in accordance with the invention. The drawing shows merely the components which are of relevance for carrying out the described method; other customary components of a mobile telephone have been omitted for the sake of clarity.

The reference numeral 1 denotes the general system of a mobile telephone with all of its operative elements. Such operative elements include a second clock generator 2 which is denoted by the reference T2. With the system 1 there is associated a real-time clock 3 which has its own clock generator 4 which is denoted by the reference T1 in the figure. The real-time clock also includes means 5 in the form of an appropriate software program which serves to determine the necessary correction of the real time which is displayed, for example, on a display 6.

The real-time clock 3 communicates with a register memory 7 in which a ratio value V, determined by suitable arithmetic means 8 of the system 1, is written continuously. This purely arithmetically determined ratio value V represents the ratio of the frequency of the second clock generator 2 to the actual frequency of the first clock generator 4. The second clock generator 2 is a very stable 13 MHz oscillator via which the entire system of the mobile telephone operates. In respect of the transmission mode this system operates in the frame mode in which the time-related information concerning the relevant frame is supplied by the first clock generator 4 for the real-time clock. The arithmetic means 8 can determine the ratio V from the succession of frames in relation to the oscillation mode of the second clock generator 2.

The means 5 of the real-time clock 3 are constructed in such a manner that they are capable of determining the actual frequency of the real-time clock from the ratio V. This ratio is determined and stored anew at predetermined time intervals. Because the second clock generator 2 oscillates in a very stable manner, any changes of the stored ratio can be attributed exclusively to changes of the frequency of the first clock generator 4, for example, a 32 kHz oscillator.

After determination of the actual frequency of the real-time clock, the means 5 determine the ratio $V_{clock/standard}$ of the actual frequency of the real-time clock to the reference frequency of a standard clock. A frequency of 32768 Hz is to be considered as the standard clock in the case of a first clock generator 4 formed by a 32 kHz oscillator. Depending on whether the clock is fast or slow, this ratio will be larger or smaller than 1. Subsequently, the means 5 determine the deviation time of the real-time clock per second from the difference $(1-V_{clock/standard})$. Subsequently, from this deviation time per second the means 5 determine the time difference dt after which the real-time clock must be corrected by a predetermined correction time difference Δt, for example, one second. After determination of this time difference, the corresponding correction of the clock is performed continuously, that is, each time after expiration of such a time difference, the overall operation advantageously being automatic and continuous. The display 6 thus continuously displays the correct clock time or, in as far as no seconds are displayed, the clock time displayed is based at least on the correct real time.

Hereinafter, the method in accordance with the invention will be illustrated briefly again on the basis of an example.

It is assumed that the first clock generator 4 is a 32 kHz oscillator and that the second clock generator 2 is a 13 MHz generator. It is also assumed that for the ratio V the value "403.50" is written in the register 7.

The actual frequency of the real-time clock is calculated therefrom as follows:

$$f_{actual\text{-}clock} = \frac{13 \text{ MHz}}{403,50} = 32218.1.$$

The actual frequency of the real-time clock thus amounts to 32218.1 Hz, that is, starting from the ratio V=403.50 determined at an earlier instant.

The ratio $V_{clock/standard}$ results therefrom as follows:

$V_{clock/standard}$=32218,1:32768=0,983.

A deviation time of the real-time clock per second is then calculated as:

$t_{deviationerror/s}$=1−$V_{clock\ standard}$=1−0.983=0.017.

Thus, the real-time clock is 0.017 seconds slow per second.

The time difference dt after which a correction time difference Δt of one second has accumulated can be calculated therefrom:

dt=1:0.017=58.823 s.

This means that the real-time clock, being slow in this case, is to be advanced by one second after 58.823 seconds.

Overall, the method in accordance with the invention enables simple correction of the real-time clock. The accuracy of the first clock generator used in the real-time clock is then no longer determined by the accuracy requirements of the real-time clock, which can be simply corrected on the basis of the method in accordance with the invention, but by other components of the system, so that cheaper quartz crystals can be used for the first clock generators, if desired. Furthermore, additional components such as, for example, a variable capacitor via which the deviation of the real-time clock is corrected in conformity with the state of the art (being an intricate operation because of the components additionally required for controlling the capacitor) can now be dispensed with. Moreover, the correction time automatically takes into account also the temperature dependency of the first clock generator.

The invention claimed is:

1. A method of correcting a real-time clock of an electronic apparatus, the real-time clock operating with a first clock generator which generates a real-time clock while the electronic apparatus operates with a second clock generator which generates a system clock, the method comprising:
determining the actual frequency of the real-time clock
determining the ratio $Vc_{clock/standard}$ of the actual frequency of the real-time clock to the actual reference frequency of a standard clock,
determining the deviation time of the real-time clock per second from the difference $(1-V_{clock/standard})$,
determining, on the basis of the deviation time per second, a time difference dt within which the real-time clock is to be corrected by a correction time difference Δt,
correcting the real time by Δt after expiration of dt.

2. A method as claimed in claim 1, wherein the actual frequency is determined from a ratio of the frequency of the system clock to the actual frequency of the real-time clock.

3. A method as claimed in claim 1 or 2, wherein for the time difference it is determined when the real-time clock is to be corrected by a correction time difference of one second.

4. A method as claimed in claim 1, wherein the determination and correction are carried out automatically and continuously.

5. A real-time clock for generating and delivering signals indicating the time of day, which clock includes:
a clock generator (4) for generating a real-time clock for operating the real-time clock (3), and
means (5) for determining the deviation time of the real-time clock per second and, on the basis thereof, a time difference dt within which the real-time clock is to be corrected by a correction time difference Δt, as well as for correcting the real time after expiration of the time difference dt, wherein the means are adapted to determine the ratio of the actual frequency of the real-time clock to the actual reference frequency of a standard clock.

6. A real-time clock as claimed in claim 5, wherein the means (5) are arranged to determine the actual frequency of the real-time clock, to determine the deviation time of the real-time clock per second from the difference $(1-V_{clock/standard})$, and to determine a time difference dt, on the basis of the deviation time per second, within which the real-time clock (3) is to be corrected by a correction time difference Δt.

7. A real-time clock as claimed in claim 6, wherein the means (5) are arranged to determine the actual frequency of the real-time clock from an already known ratio of the frequency of a system clock at which the electronic apparatus comprising the real-time clock (3) operates to the actual frequency of the real-time clock.

8. A real-time clock as claimed in claim 5, wherein the means (5) are implemented in the form of a computer program with program coding means.

9. An electronic apparatus, which includes a real-time clock as claimed in claim 5, which operates with a second clock generator (2) which generates a system clock and with which the electronic apparatus operates.

* * * * *